United States Patent
Ho et al.

(10) Patent No.: US 7,921,542 B2
(45) Date of Patent: Apr. 12, 2011

(54) MANUFACTURING METHOD OF A DISK DRIVE UNIT

(75) Inventors: YiuSing Ho, HongKong (CN);
GuoHong Lu, DongGuan (CN);
CanHua Chen, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 1097 days.

(21) Appl. No.: 11/029,536

(22) Filed: Jan. 6, 2005

(65) Prior Publication Data

US 2006/0146447 A1 Jul. 6, 2006

(51) Int. Cl.
*G11B 5/127* (2006.01)
*H04R 31/00* (2006.01)

(52) U.S. Cl. .............. 29/603.03; 29/603.04; 29/603.06; 29/603.07; 360/245.9; 360/264.2; 427/127; 427/128

(58) Field of Classification Search .............. 29/603.03, 29/603.04, 603.06; 360/245.9, 264.2; 427/127, 427/128

See application file for complete search history.

(56) References Cited

U.S. PATENT DOCUMENTS

| | | | | |
|---|---|---|---|---|
| 6,034,843 A * | 3/2000 | Tsujino et al. | ............. | 360/265.8 |
| 6,098,271 A * | 8/2000 | Yamamoto et al. | ........ | 29/603.06 |
| 6,703,566 B1 * | 3/2004 | Shiraishi et al. | .............. | 174/260 |
| 6,937,443 B2 * | 8/2005 | Wang et al. | ................ | 360/265.8 |
| 7,362,545 B2 * | 4/2008 | Ho et al. | .................... | 360/264.2 |

* cited by examiner

*Primary Examiner* — Paul D Kim
(74) *Attorney, Agent, or Firm* — Nixon & Vanderhye, P.C.

(57) ABSTRACT

Certain example embodiments relate to a manufacturing method for a disk drive unit. At least one head gimbal assembly having first terminal pads is provided. A controlling circuit for controlling the at least one head gimbal assembly is provided, with the controlling circuit having second terminal pads to connect with the first terminal pads. The at least one head gimbal assembly is disposed in a motor base. The controlling circuit is disposed in the motor base. The at least one head gimbal assembly and the controlling circuit are tightened to the motor base such that the first and second terminal pads are face-to-face and have an electrical touch contact therebetween.

8 Claims, 15 Drawing Sheets

MANUFACTURING METHOD OF A DISK DRIVE UNIT

FIELD OF THE INVENTION

The present invention relates to head stack assemblies, disk drive units and manufacturing methods thereof, and more particularly to a method of connecting the head stack assemblies with its control circuit.

BACKGROUND OF THE INVENTION

Figure 1:
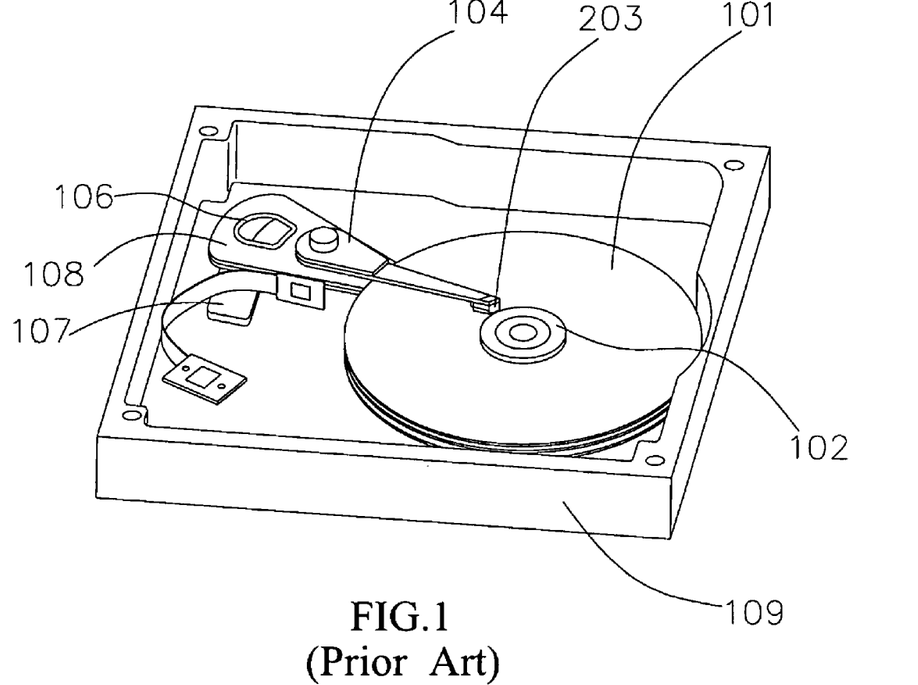
FIG. 1 is a perspective view of a traditional disk drive unit.

Disk drives are information storage devices that use thin film magnetic media to store data. Referring to FIG. 1, a typical disk drive in prior art comprises a head stack assembly (HSA) 104 with slider(s) 203 thereon, a magnetic disk 101 mounted on a spindle motor 102 which causes the magnetic disk 101 to spin, and a motor base 109 to enclose the above-mentioned components. The slider(s) 203 flies over the surface of the magnetic disk 101 at a high velocity to read data from or write data to concentric data tracks on the magnetic disk 101, which is positioned radially by a voice coil 106 embedded (e.g. by epoxy potting or overmolding) in a fantail spacer 108 of the HSA 104. Generally, a voice coil motor (VCM) 107 is used to drive the voice coil 106.

Figure 3A:
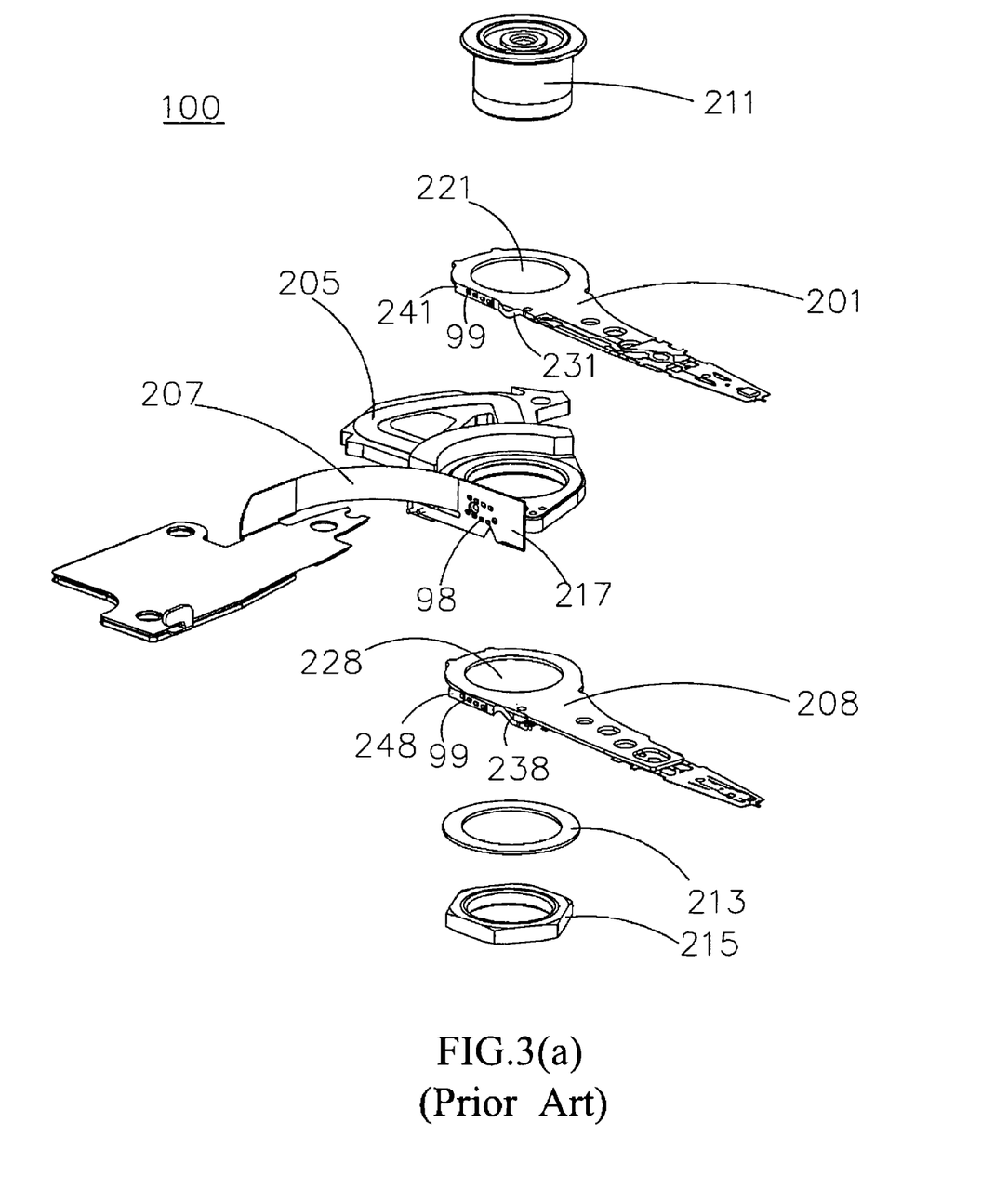
FIG. 3(a) is an exploded, perspective view of a head stack assembly (HSA) of the disk drive in FIG. 2.
Figure 3B:
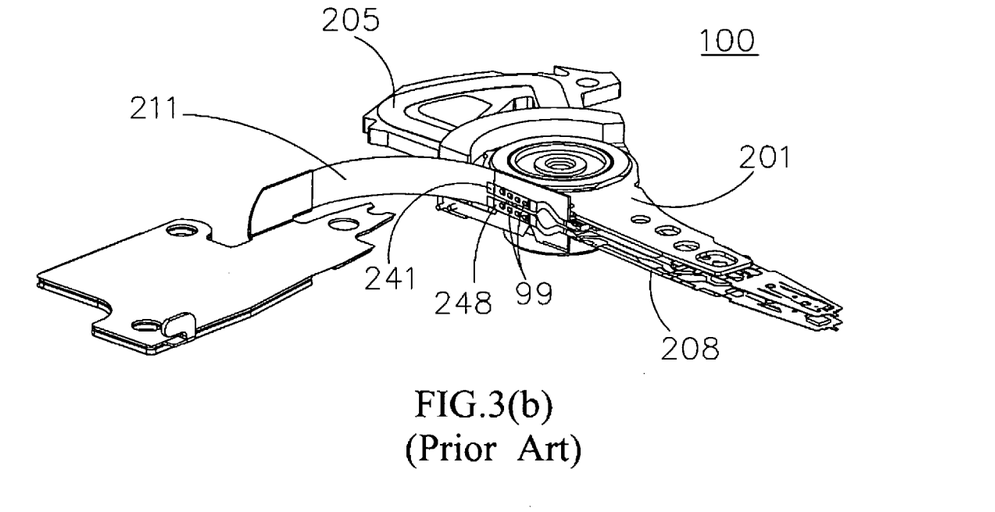
FIG. 3(b) is a perspective view of the assembled HSA in FIG. 3(a)

Referring to FIGS. 3(*a*) and 3(*b*), a traditional HSA 100 comprises two head gimbal assemblies (HGAs) 201 and 208, a fantail spacer 205 interposed between the head gimbal assembly (HGA) 201 and the HGA 208, and a plurality of securing means to couple the two HGAs 201 and 208 with the fantail spacer 205 together. A flexible printed circuit (FPC) 207 aligns with the fantail spacer 205 by a FPC assembly 217 to electrically connect with the two HGAs 201 and 208. Also, the FPC assembly 217 is provided a plurality of FPC pads 98 thereon. In the related art, the plurality of securing means comprises a bearing 211, a washer 213 and a nut 215. In addition, two mounting holes 221, 228 are formed in the two HGAs 201 and 208, respectively. In the fantail spacer 205 a mounting hole 225 forms corresponding to the mounting holes 221 and 228. These mounting holes 221, 228 and 225 are provided to permit the bearing 211 extend therethrough so as to combine the above-mentioned components together with the help of the washer 213 and the nut 215.

In the prior art, also referring to FIGS. 3(*a*) and 3(*b*), the HGA 201 has a suspension flexure cable 231 running from the slider (not labeled) to a trace terminal 241 of the suspension flexure cable 231; similarly, the HGA 208 comprises a suspension flexure cable 238 which terminates with a trace terminal 248. Each of the traces terminals 241 and 248 forms a plurality of terminal pads 99 thereon and each of the terminal pads 99 is shaped as a through-hole.

Figure 2:
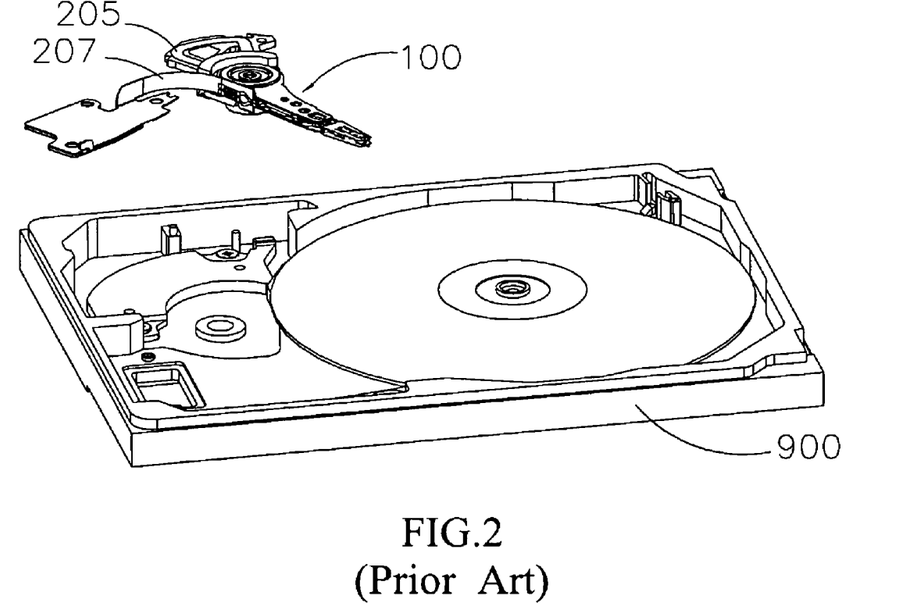
FIG. 2 is a perspective view of another traditional unassembled disk drive unit.

Referring to FIGS. 3(*a*)-3(*b*), when the HSA 100 is assembled, the trace terminals 241 and 248 are positioned on the FPC assembly 217. Then, the HGAs 201 and 208 are electrically connected with the FPC 207 by solder bonding the terminal pads 99 of the trace terminals 241 and 248 with the FPC pads 98 of the FPC assembly 217. After that, with reference to FIG. 2, the HSA 100 is mounted in a motor base 900, and later other essential parts are also assembled in the motor base 900 to form a disk drive unit.

However, the traditional method to connect HGA with FPC by solder bonding can result in component contamination. To avoid component contamination, it is necessary to clean the HSA after solder bonding and yet such cleaning is rather difficult and costly because the bearing has some lubricant thereon and can not clean by water. More seriously, the solder bonding can cause damage to the surrounding electrical components and/or disk media during soldering. In addition, because the HSA must be cleaned before it is mounted in the base plate of the disk drive, so the HSA assembly line and the HDD assembly line cannot be integrated together. That is to say, it must assemble a HSA in HSA assembly line, and then install the HSA into the motor base in HDA assembly line. Furthermore, when there is something wrong with the HGA or the FPC, it must separate the HGA with the FPC for rework, such as repairing or replacing. However, separating the HGA with the FPC is also troublesome because the solders therebetween must be deleted and accordingly reworking the HSA is rather time-consuming and costly. Finally, when there is something wrong with some parts of the HSA, such as HGA, it is required to disassemble the whole HSA from the disk drive unit at first for repairing, accordingly, the cost for reworking the disk drive unit is rather high.

It is therefore desirable to provide a head stack assembly, disk drive unit, and manufacturing method thereof to solve the above-mentioned problems.

SUMMARY OF THE INVENTION

A main feature of the present invention is to provide a disk drive unit which is easily assembled and can rework its HGA in disk drive level, and a manufacturing method thereof.

Another feature of the present invention is to provide a HSA which is easily assembled and reworked, and a manufacturing method thereof.

A further feature of the present invention is to provide a method of connecting a terminal of HGA with a terminal of its control circuit.

To achieve the above-mentioned features, a disk drive unit of the invention comprises a motor base; a disk stack comprising at least one disks; a spindle motor being attached to the motor base for rotating the disk stack; and a HSA comprising at least one HGA, which having first terminal pads; and a controlling circuit for controlling the at least one HGA, which having second terminal pads to connect with the first terminal pads; wherein both the first and second terminal pads are axially tightened face-to-face to have an electrical touch contact.

In the present invention, each of the first and second terminal pads has a conductive layer thereon. In an embodiment, the disk drive unit further comprises conductive supporter disposed between the first and second terminal pads.

A manufacturing method of disk drive unit comprises the steps of: providing at least one HGA, which having first terminal pads; providing a controlling circuit for controlling the at least one HGA, which having second terminal pads to connect with the first terminal pads; disposing the at least one HGA into a motor base; disposing the controlling circuit into the motor base; tightening the at least one HGA and the controlling circuit to the motor base so as to tighten both the first and second terminal pads face-to-face to have an electrical touch contact therebetween.

In the present invention, the method comprises a step of plating each of the first and second terminal pads with a conductive layer thereon. In an embodiment, the method further comprises a step of disposing conductive supporter between the first and second terminal pads before they are tightened.

A HSA of the present invention comprises at least one HGA, which having first terminal pads; and a controlling circuit for controlling the at least one HGA, wherein said controlling circuit having second terminal pads; wherein both the first and second terminal pads are axially tightened face-to-face to have an electrical touch contact.

In the present invention, each of the first and second terminal pads has a conductive layer thereon. In an embodiment, the conductive layer is metal layer, such as gold layer. In another embodiment, the method further comprises conductive supporter disposed between the first and second terminal pads.

In the invention, the conductive supporter is a soft metal solid and/or an oxidation resistance metal solid. In an embodiment, the conductive supporter is gold solid or gold ball.

A method of electrically connecting a terminal of HGA with a terminal of controlling circuit thereof comprises the steps of: facing first terminal pads of at least one HGA and connecting second terminal pads of its controlling circuit to contact with each other; and both the first and second terminal pads are axially tightened face-to-face to have an electrical touch contact.

In the present invention, the method comprises a step of plating each of the first and second terminal pads with a conductive layer thereon. In an embodiment, the method further comprises a step of disposing conductive supporter between the first and second terminal pads to support their electrical touch contact. The conductive supporter may be a metal ball, such as gold ball.

Comparing with the prior art, the present invention solves the problems of component contamination, component damage, and cleaning because solder is not used in connection process. In addition, because the head stack assembly of the present invention do not need being cleaned before it is mounted in the motor base of the disk drive, so the HSA assembly line and the disk drive assembly line can be integrated together, accordingly it improves the efficiency of manufacturing the disk drives. Finally, because the first terminal pads and the second terminal pads are axially secured with each other by secure means, so when there is something wrong with the HGA or the FPC, it can rework the HGA etc. in disk drive level.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 4A:
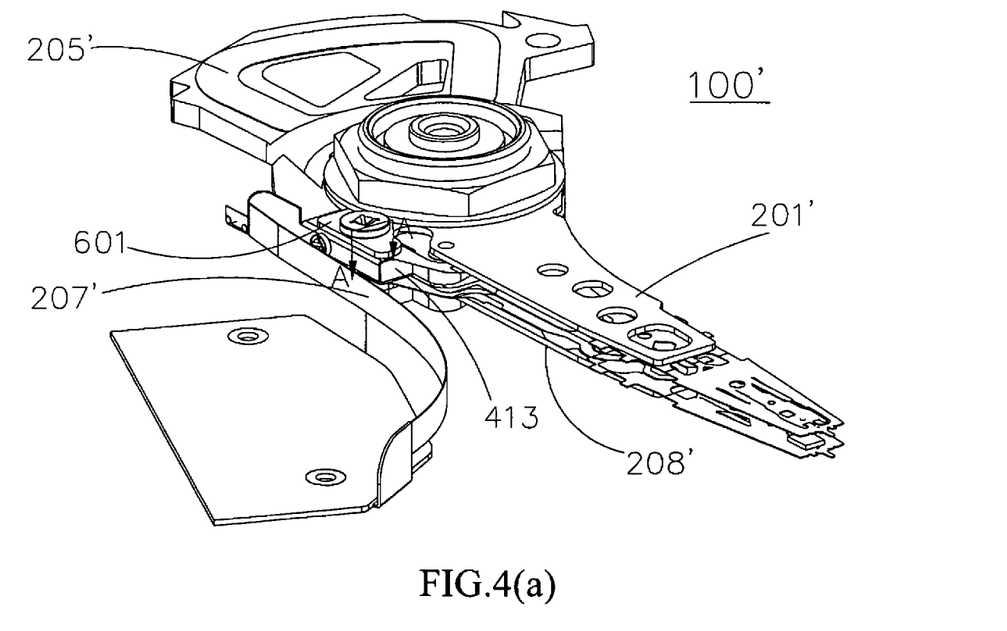
FIG. 4(a) is a perspective view of an assembled HSA according to an embodiment of the present invention.
Figure 4B:
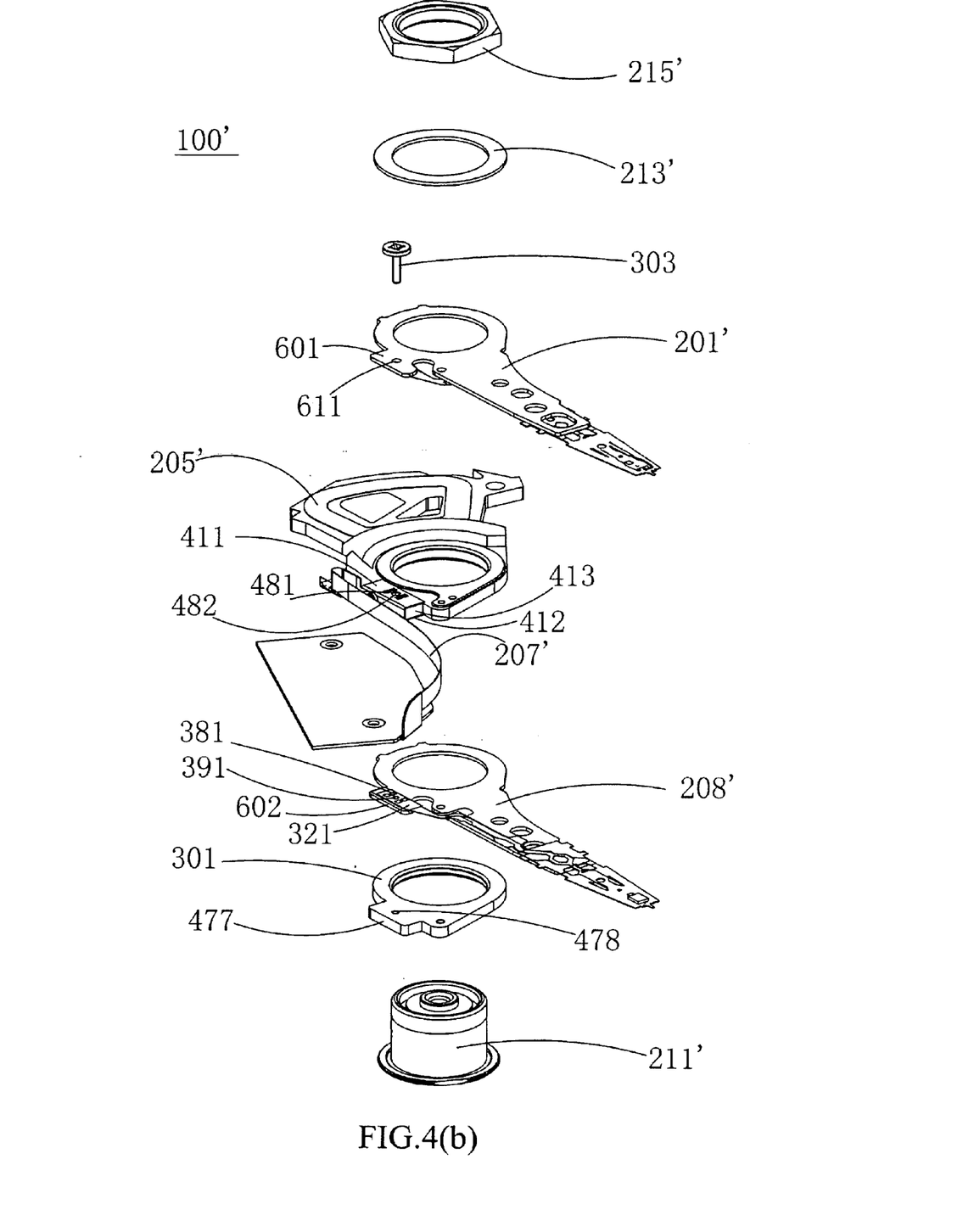
FIG. 4(b) is an exploded, perspective view of the HSA in FIG. 4(a)

Referring now to the drawings in detail, FIGS. 4(a) and 4(b) show a head stack assembly (HSA) of a disk drive unit according to a first embodiment of the present invention. The HSA 100' comprises two HGAs 201', 208' and a fantail spacer 205' interposed between the HGA 201' and the HGA 208'. In the present invention, a plurality of securing means are provided to couple the two HGAs 201', 208' with the fantail spacer 205' together. In an embodiment of the present invention, the plurality of securing means comprises a bearing 211', a screw 303, two washers 213', 301, and a nut 215'. The HGA 201' has a support plate 601 with a screw hole 611 formed therein, and the HGA 208' also has a support plate 602 with a screw hole (not shown) formed therein. In addition, the fantail spacer 205' forms a protrusion 413 with a screw hole (not shown) corresponding to the support plates 601 and 602. Referring to FIG. 4(b), the washer 301 is also provided with a support protrusion 477 having a screw hole 478 therein.

Figure 6:
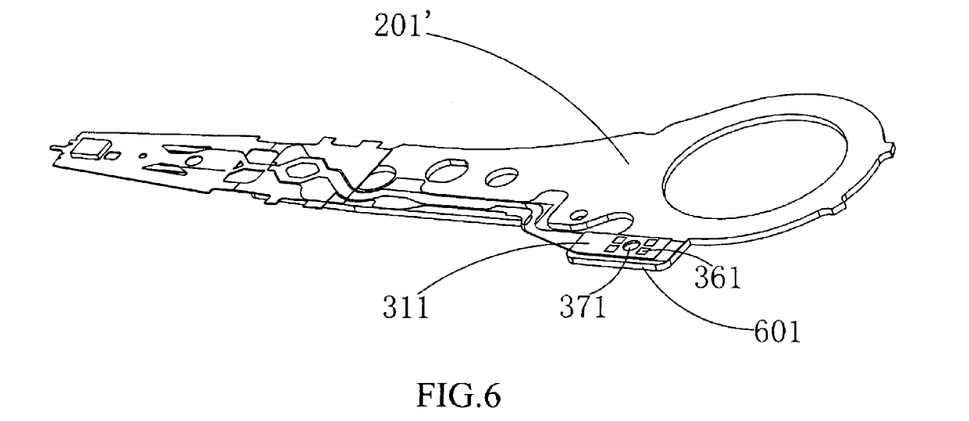
FIG. 6 is a perspective view of a HGA of the HSA in FIG. 4(b)

Referring to FIGS. 4(b) and 6, each of the two HGAs 201' and 208' has a suspension flexure cable which terminates with a trace terminal, i.e. the HGA 201' has a trace terminal 311, the HGA 208' has a trace terminal 321. The trace terminal 311 is positioned on the support plate 601 and provided with a plurality of terminal pads 361 and a screw hole 371 therein. Similarly, the trace terminal 321 is positioned on the support plate 602 and provided with a plurality of terminal pads 381 and a screw hole 391 therein.

Figure 5:
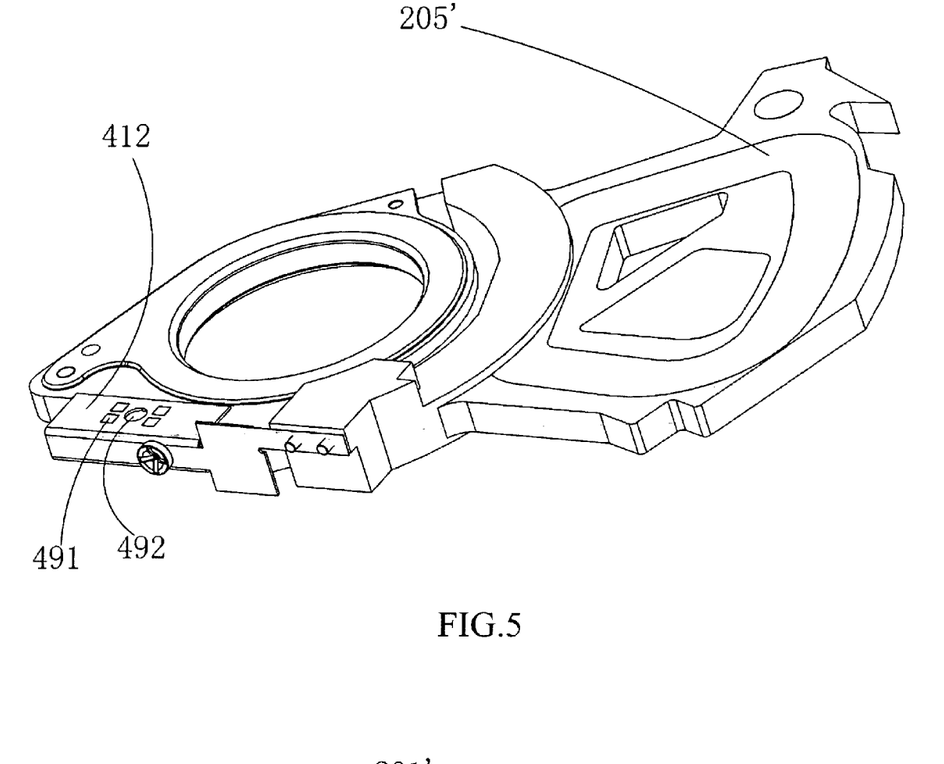
FIG. 5 is an enlarged, perspective view of an fantail spacer of the HSA in FIG. 4(b)

Referring to FIGS. 4(b) and 6, a flexible printed circuit (FPC) 207' is aligned with the fantail spacer 205' at an end thereof to electrically connect with the two HGAs 201' and 208'. As an embodiment of the present invention, the FPC 207' is aligned with the fantail spacer 205' by two FPC assemblies 411 and 412 secured to an end of the FPC 207'. The two FPC assemblies 411 and 412 are positioned two sides of the protrusion 413 of the fantail spacer 205'. Additionally, the FPC assembly 411 is provided with a plurality of FPC pads 481 and a screw hole 482 corresponding to the terminal pads 361 and the screw hole 371 of the trace terminal 311, respectively. Similarly, referring to FIG. 5, a plurality of FPC pads 491 and a screw hole 492 are formed on the FPC assembly 412 corresponding to the terminal pads 381 and the screw hole 391 of the trace terminal 321.

Figure 7:
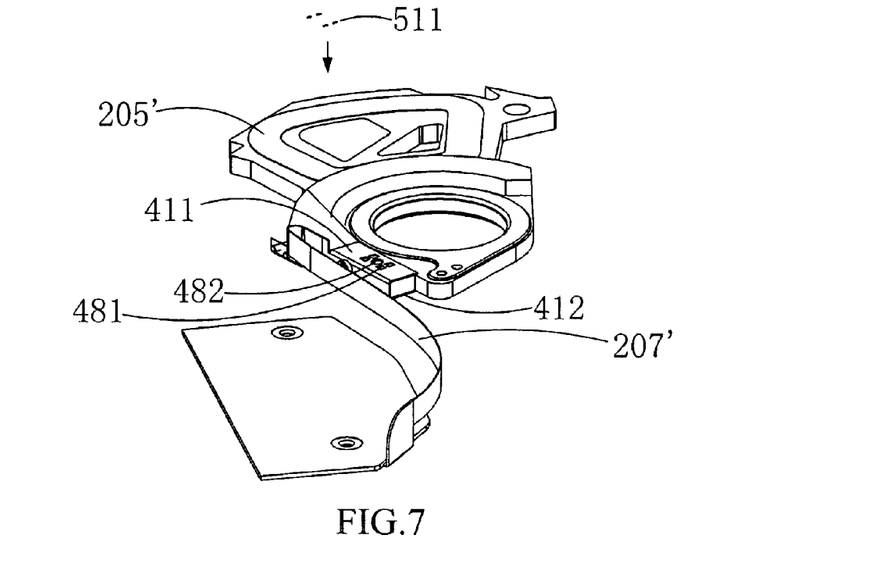
FIG. 7 shows a process of putting a plurality of gold balls on FPC pads of FPC assemblies of the HSA in FIG. 4(b)
Figure 8:
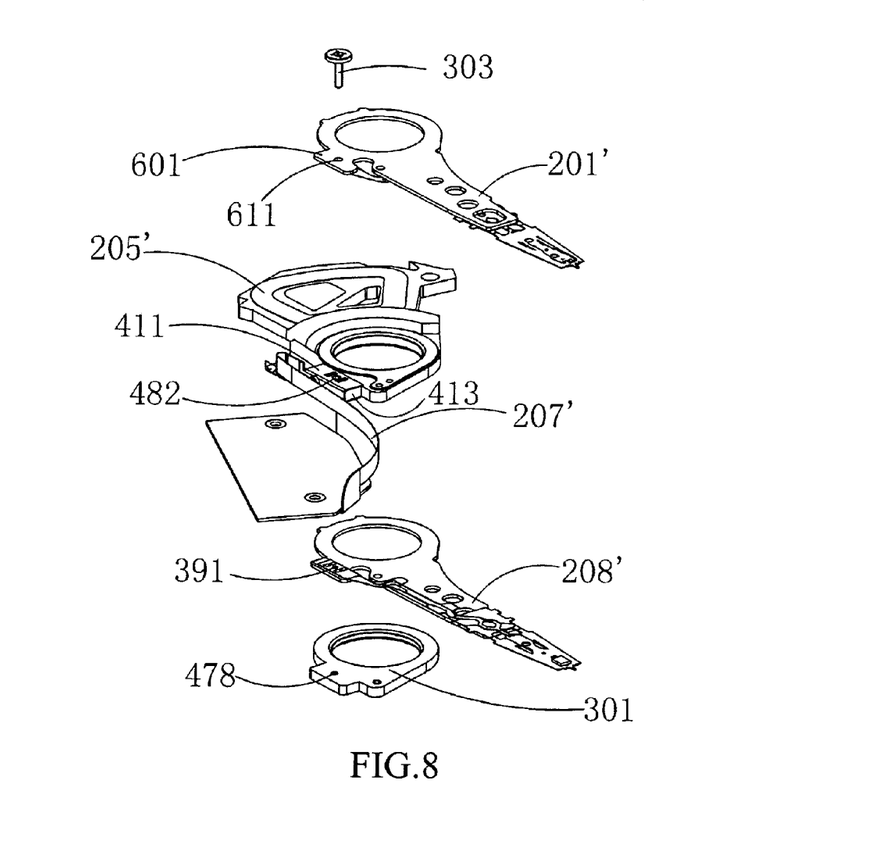
FIG. 8 shows a process of fastening the FPC assemblies with trace terminals of the HGAs of the HSA in FIG. 4(b)
Figure 9:
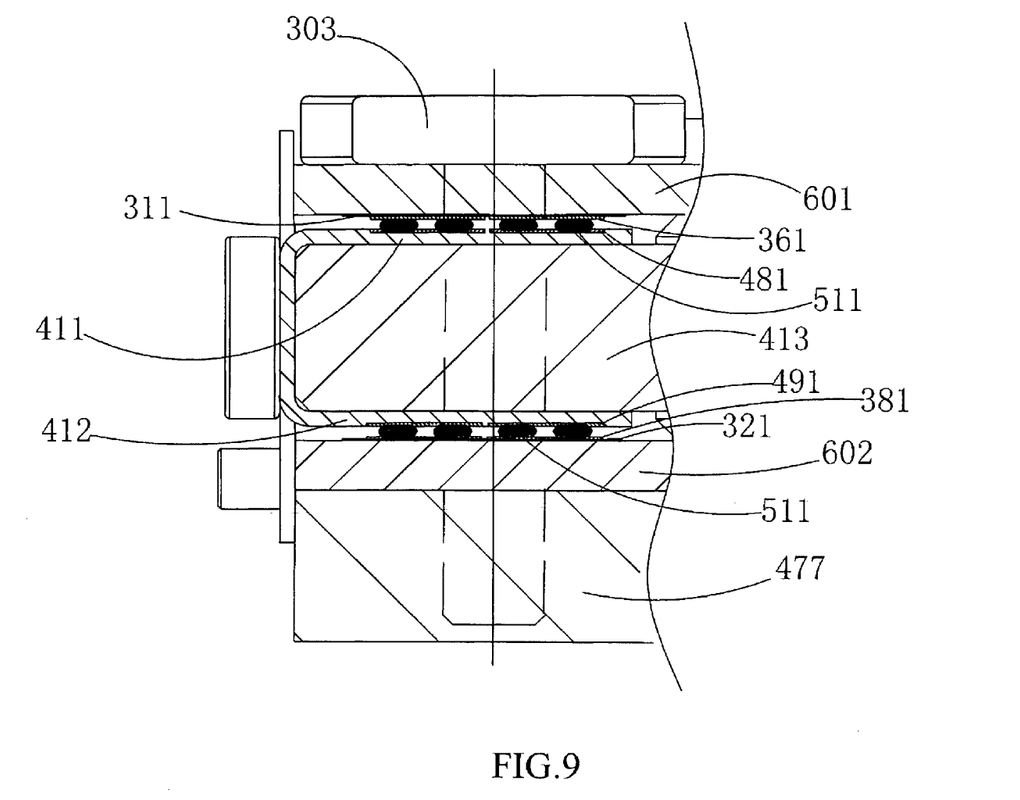
FIG. 9 is a partial, cross-sectional view of the HSA in FIG. 4(a) taken along line A-A.
Figure 9A:
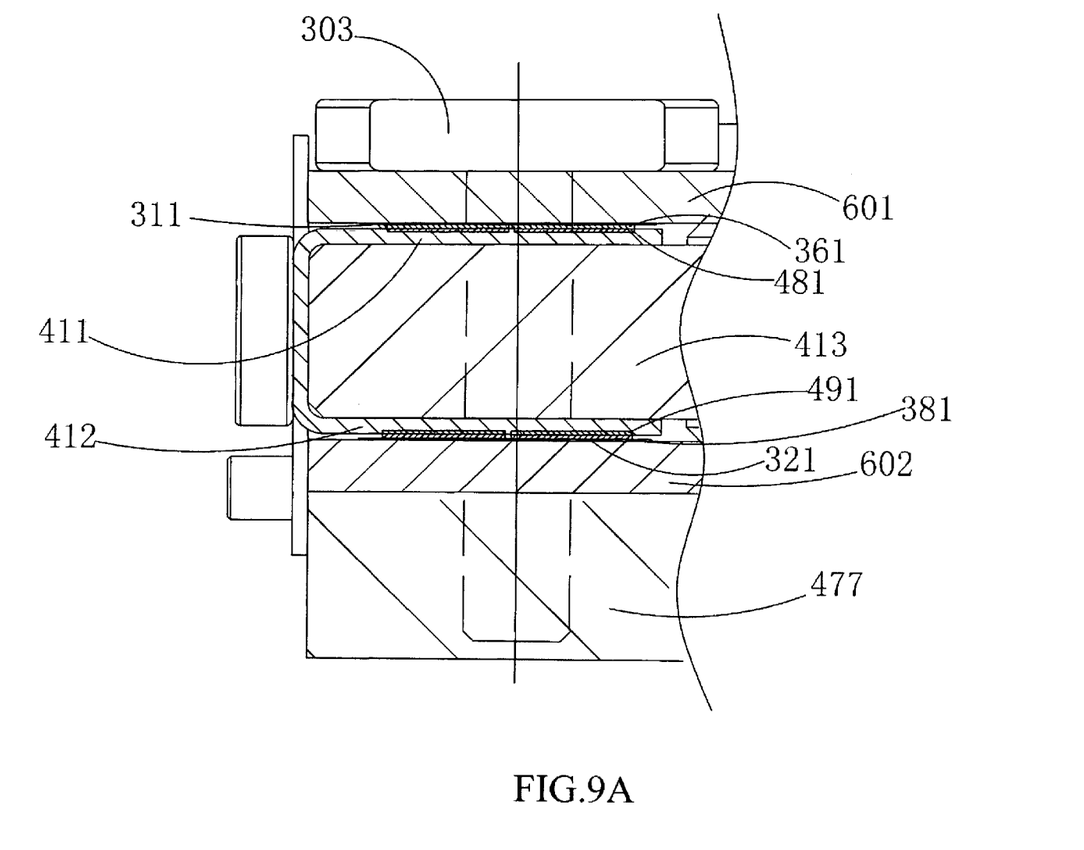
FIG. 9A is a cross-sectional view of the HSA of FIG. 9 without gold balls.

During assembly of the HSA 100', firstly, the fantail spacer 205' is aligned with the FPC 207'. Then, referring to FIG. 7, a plurality of gold balls 511 are provisionally disposed on the FPC pads 481 of the FPC assembly 411 and the FPC pads 491 of the FPC assembly 412. After that, referring to FIGS. 8 and 9, the two HGAs 201', 208', the fantail spacer 205' with the FPC 207', and the washer 301 are assembled together by a screw 303. Thus, the trace terminal 311 of the HGA 201' is pressed to the FPC assembly 411 and simultaneously the trace terminal 321 of the HGA 208' is pressed to the FPC assembly 412. Accordingly, the gold balls 511 are sandwiched between the FPC pads 481 and the terminal pads 361, and between the FPC pads 491 and the terminal pads 381 as well. Thus superior electrical connections between the two HGAs 201', 208' and the FPC 207' is attained, see FIG. 4(a). Finally, with reference to FIG. 4(b), a plurality of locking members, i.e. the bearing 211', the washers 213' and the nut 215', are used to secure the two HGAs 201', 208' with the fantail spacer 205' together to form a HSA 100', as shown in FIG. 4(a). In the present invention, the support plates 601, 602, the protrusion 413 and the support protrusion 478 are superposed together with the screw holes thereon corresponding with each other, and a screw 303 is used to extend through the screw holes so as to sandwich the gold balls 511 firmly. In the present invention, the gold balls 511 are used for supporting an electrical touch contact of the FPC pads 481, 491 with the terminal pads 361, 381. When reworking the HSA 100', it only needs to uninstall the screw 303, and the FPC pads 481, 491 will be separated with the terminal pads 361, 381 automatically because the gold balls are just provisionally disposed therebetween, while the related art must have a cleaning process because it uses solder bonding to connect the FPC pads with the terminal pads. Understandably, the gold balls 511 can be omitted herefrom, and the FPC pads 481, 491 touch contact with the terminal pads 361, 381 in a pad-to-pad way, as shown in FIG. 9A. In this embodiment, each of the FPC pads 481, 491 and the terminal pads 361, 381 has a conductive layer formed thereon, the conductive layer can be formed by plating. In an embodiment, the conductive layer is metal layer, such as gold layer.

Figure 10:
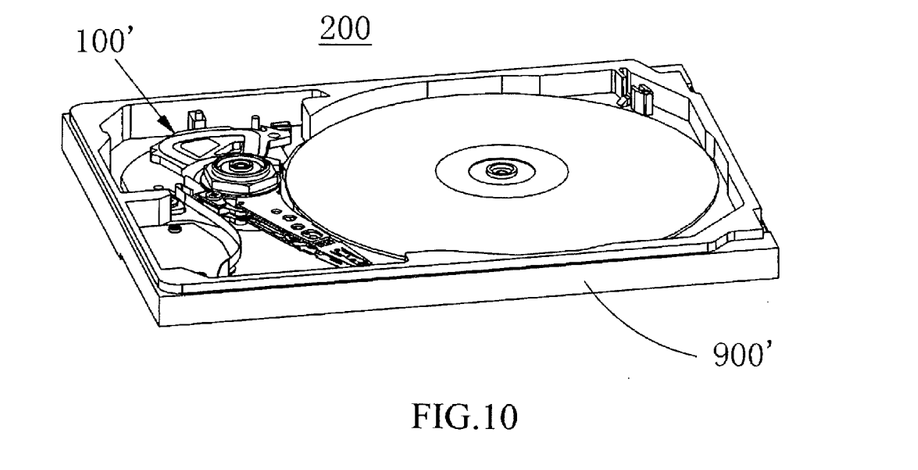
FIG. 10 is a perspective view of an assembled disk drive unit in accordance with an embodiment of the present invention.
Figure 11:
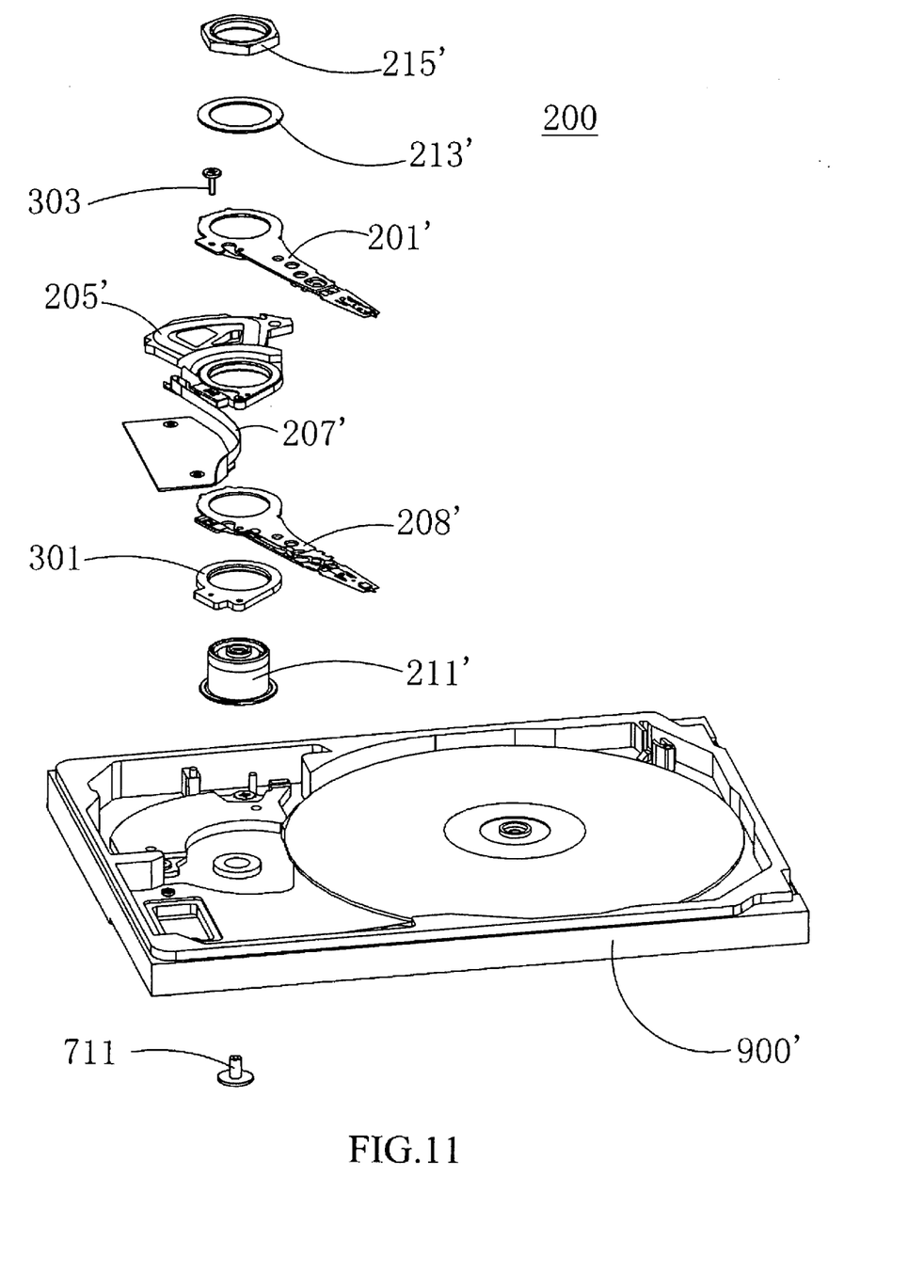
FIG. 11 is an exploded, perspective view of the disk drive unit in FIG. 10.

Referring to FIG. 11, a disk drive unit 200 using the HSA 100' may assembled as follows: firstly, mounting essential parts, such as disk, ramp load, spindle motor and VCM into the motor base 900', and then the bearing 211' can be mounted into the motor base 900' by the screw 711. Consequently, the washer 301, the HGA 208', the fantail spacer 205' with the FPC 207', the HGA 201', the washer 213' and the nut 215' are installed into the motor base 900' in sequence. Here, the nut 215' and the screw 303 are used to tighten the HGAs 201', 208', and the fantail spacer 205' with the FPC 207'. Thus electrical connection between the terminal pads of the HGAs 201', 208' and the FPC pads of the FPC 207' is established and a disk drive unit is formed, as shown in FIG. 10. For rework, it only needs to uninstall the nut 215' and the screw 303 to replace wrong/damage part in HDA level, such as replace the HGA 201 or 208.) From the assembly process, it shows that the embodiment integrates the HSA process into the HDA process so as to greatly simply the assembly process and the rework process.

Figure 12:
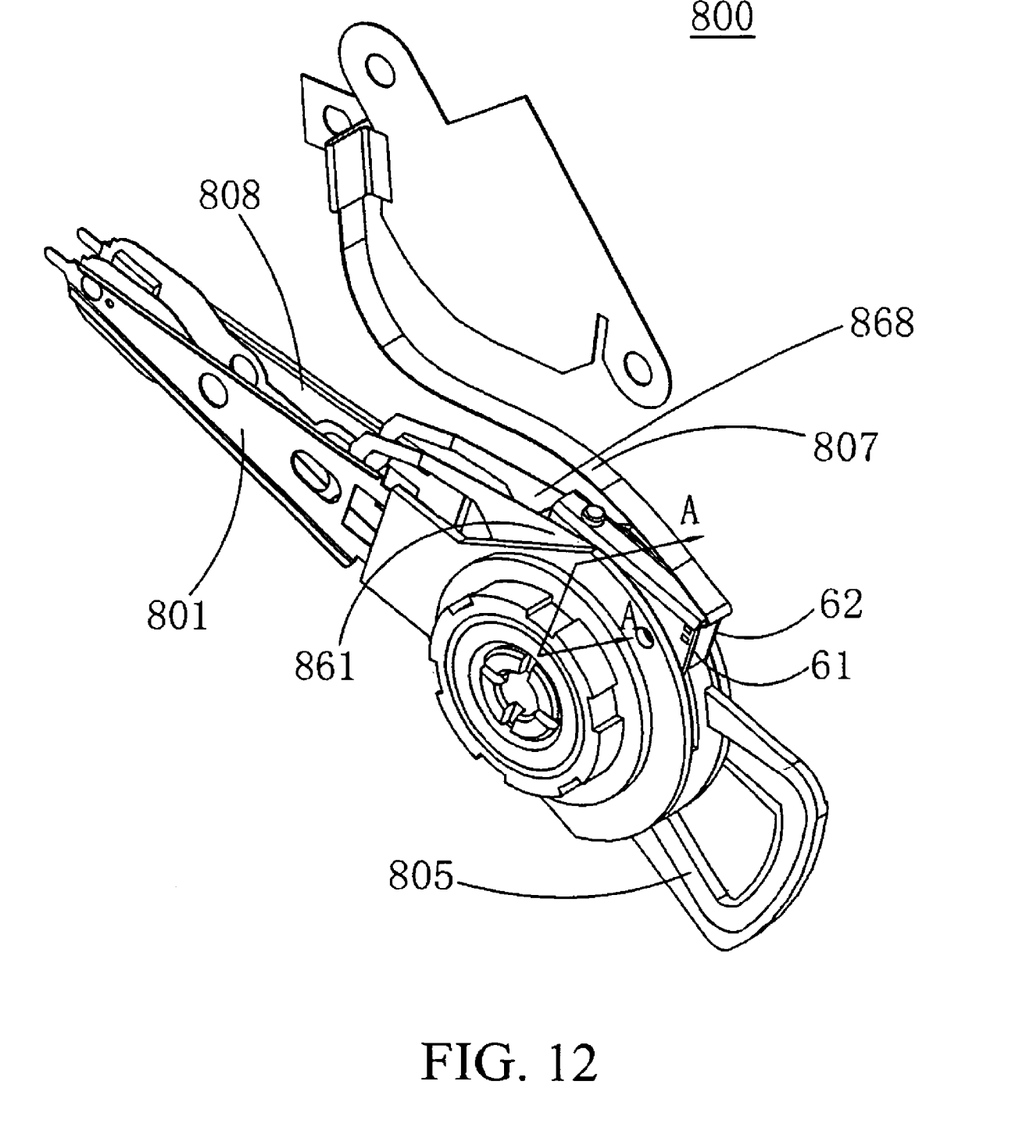
FIG. 12 is a perspective view of an assembled HSA according to a second embodiment of the present invention.
Figure 13:
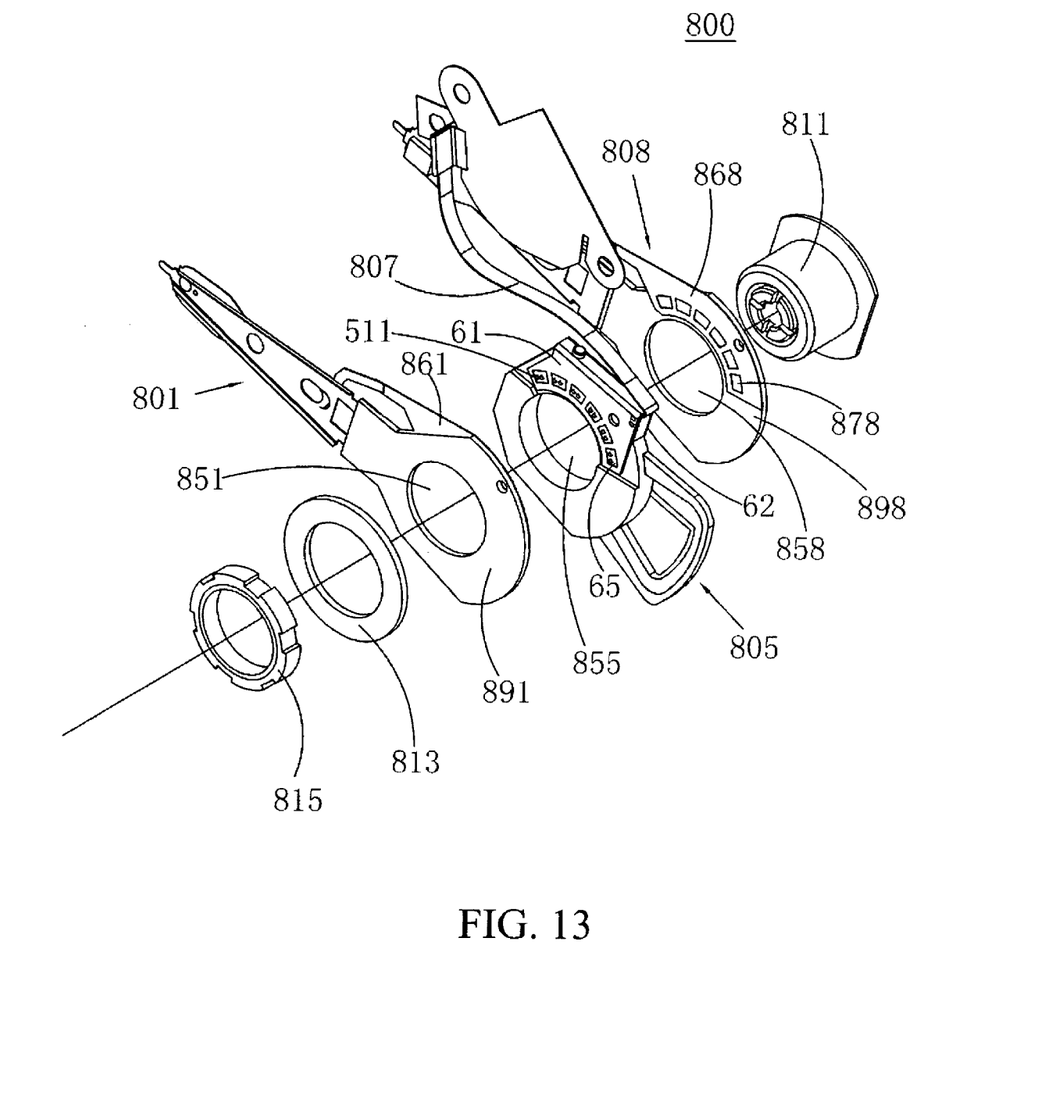
FIG. 13 is an exploded, perspective view of the HSA in FIG. 12.
Figure 14:
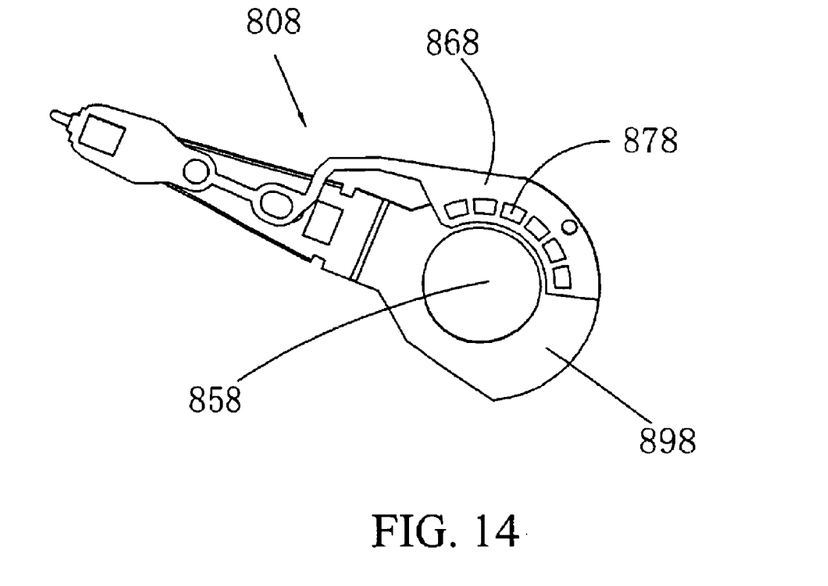
FIG. 14 is a perspective view of a HGA of the HSA in FIG. 12.
Figure 15:
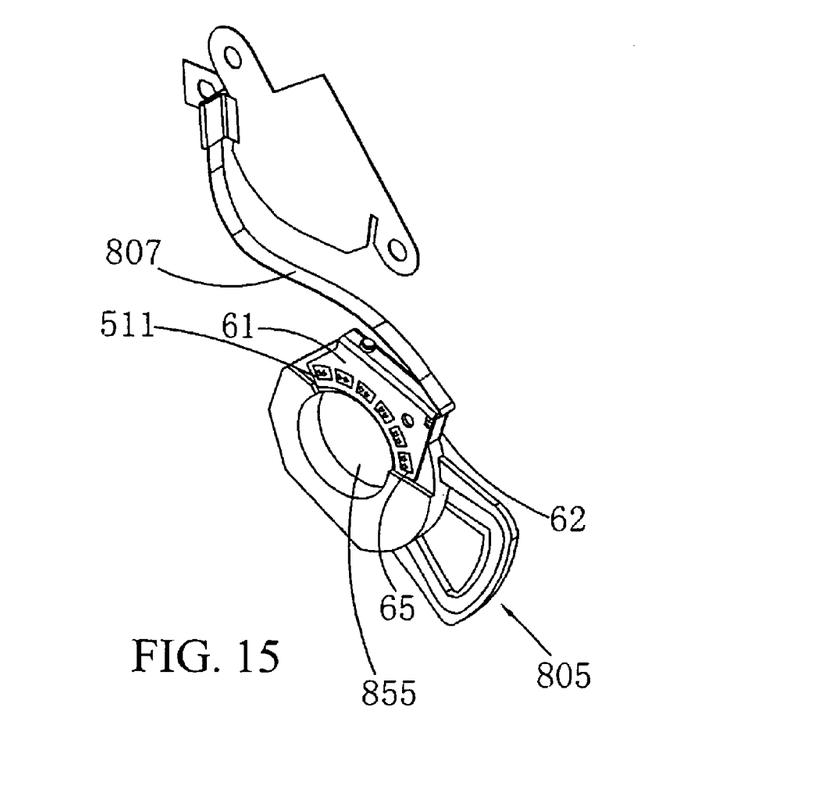
FIG. 15 is a perspective view of a fantail spacer with a FPC of the HSA in FIG 12.

Referring to FIGS. 12 and 13, according to a second embodiment of the present invention, a HSA 800 comprises two HGAs 801, 808 and a fantail spacer 805 interposed between the two HGAs 801, 808. In the embodiment, each of the HGAs 801, 808 and the fantail spacer 805 has a mounting hole (that is, the mounting hole 851 in the HGA 801, the mounting hole 858 in the HGA 808, the mounting hole 855 in the fantail spacer 805). A bearing 811 extends through the mounting holes 858, 855, 851 in sequence and couples the two HGAs 801, 808 with the fantail spacer 805 together with the help of a washer 813 and a nut 815.

Referring to FIGS. 12-14 and 17, each of the two HGAs 801 and 808 has a HGA arm and a suspension flexure cable which terminates with a trace terminal. In the embodiment, the HGA 808 has a HGA arm 898 and a trace terminal 868, the HGA 801 has a HGA arm 891 and a trace terminal 861. The trace terminal 868 is disposed on the HGA arm 891, one side of which is arc-shaped along the periphery of the mounting hole 858. A plurality of terminal pads 878 is distributed on the trace terminal 868 along the arc-shaped side of the trace terminal 868. Similarly, the trace terminal 861 is disposed on the HGA arm 891 and a plurality of terminal pads 871 are formed thereon.

Figure 16:
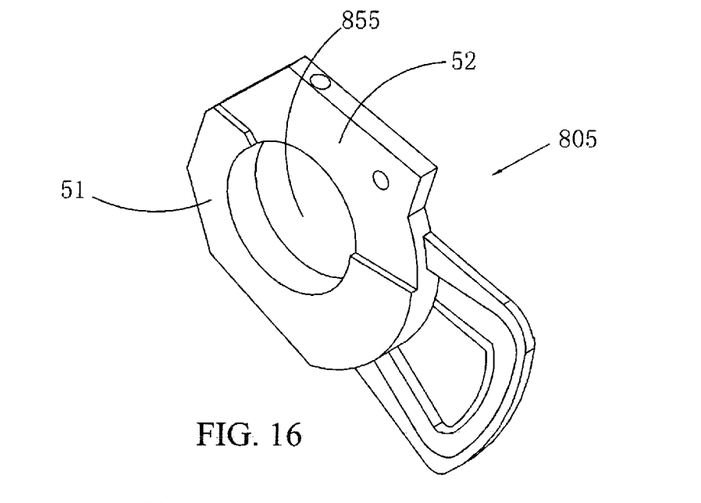
FIG. 16 is an enlarged, perspective view of an fantail spacer of the HSA in FIG. 12.

Referring to FIGS. 12, 15-17, a flexible printed circuit (FPC) 807 is aligned with the fantail spacer 805 at an end thereof to electrically connect with the two HGAs 801 and 808. In the embodiment, the fantail spacer 805 is cut a step (not labeled) on each side thereof for mounting the FPC 807 and thus forming a thick portion 51 and a thin portion 52. In the embodiment, the FPC 807 is aligned with the fantail spacer 805 by two FPC assemblies 61 and 62 which are both secured to an end of the FPC 807. Referring to FIG. 16, in the embodiment, the two FPC assemblies 61 and 62 are disposed on two sides of the thin portion 52 of the fantail spacer 805; while the two HGA arms 891, 898 are disposed on two sides of the thick portion 51 of the fantail spacer 805. Referring to FIG. 16, each of the FPC assemblies 61 and 62 has an arc-shaped side along the periphery of the mounting hole 855 corresponding to the trace terminals 861, 868 of the HGAs 801 and 808. A plurality of FPC pads 65 are provided on the FPC assembly 61 corresponding to the terminal pads 871 of the trace terminal 861. Similarly, a plurality of FPC pads 66 are formed on the FPC assembly 62 corresponding to the terminal pads 878 of the trace terminal 868.

Figure 17:
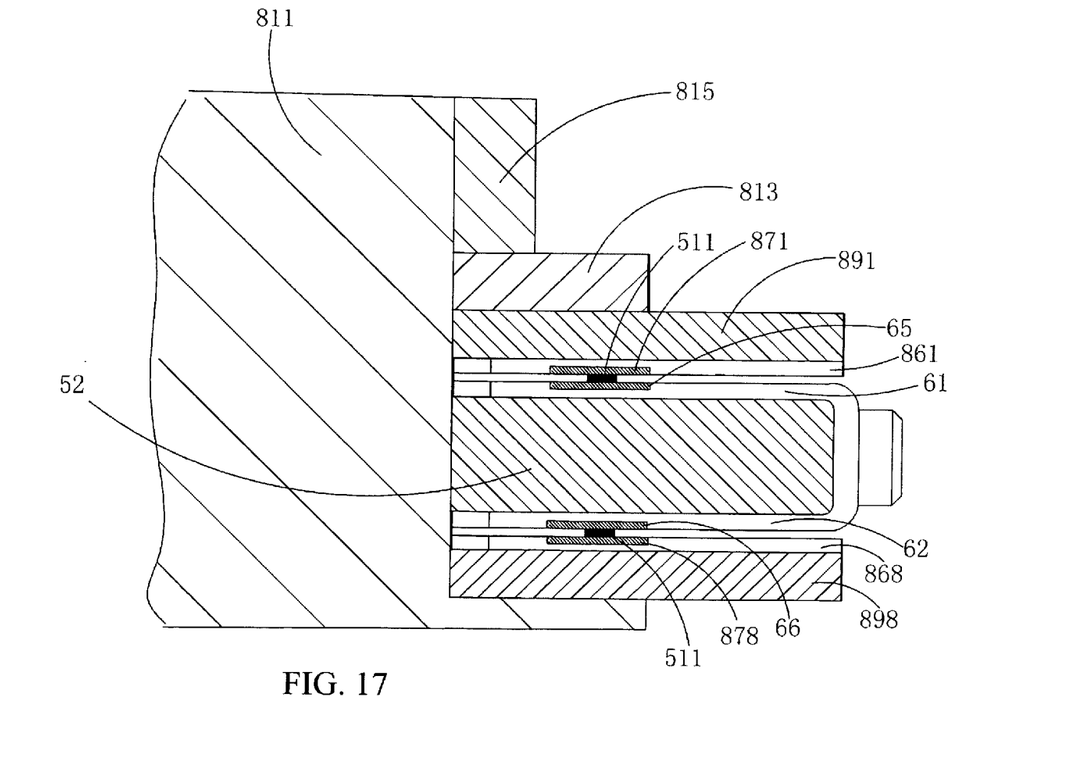
FIG. 17 is a cross-sectional view of the HSA in FIG. 12 taken along line A-A.
Figure 17A:
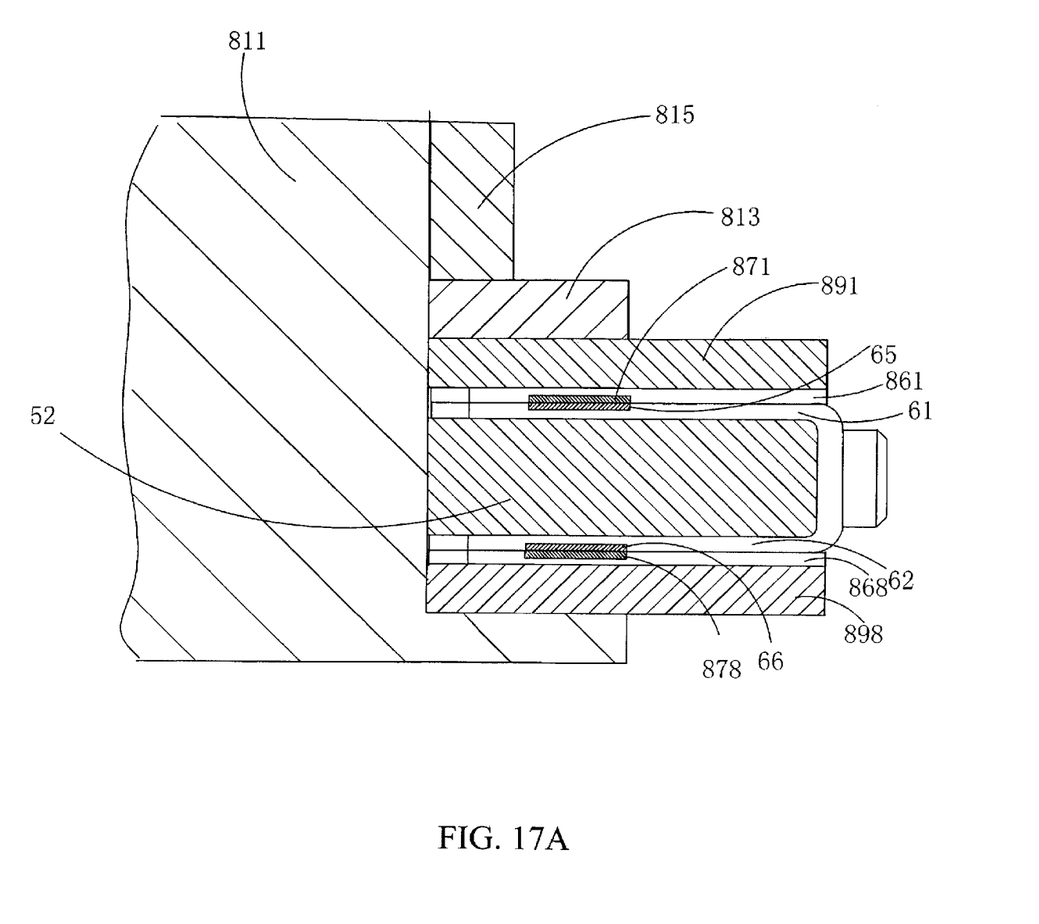
FIG. 17A is a cross-sectional view of the HSA of FIG. 17 without gold balls.

During assembly of the HSA 800, referring to FIG. 13, firstly, the fantail spacer 805 is aligned with the FPC 807, and then a plurality of gold balls 511 are provisionally disposed on the FPC pads 65, 66 of the FPC assemblies 61, 62, respectively. After that, the bearing 811 extends through the mounting holes 858, 855, 851 in sequence so as to superpose the HGAs 801, 808, the fantail spacer 805 with the FPC 807 together, accordingly, the trace terminals 861, 868 of the HGAs 801, 808 are disposed on the FPC assemblies 61, 62, respectively. Then, with the help of the washer 813 and the nut 815, the two HGAs 801, 808 and the fantail spacer 805 with the FPC 807 are assembled together to forming a HSA 800 so that the gold balls 511 are sandwiched firmly between the FPC pads 66 and the terminal pads 878, and also between the FPC pads 65 and the terminal pads 871 under the press exerted by the bearing 811, the washer 813 and the nut 815. Thus superior electrical connections between the two HGAs 801, 808 and the FPC 807 is attained, see FIGS. 12 and 17. In the present invention, the gold balls 511 act as a conductive supporter to support an electrical touch contact of the FPC pads 65, 66 with the terminal pads 871, 878. When reworking the HSA 800, it only needs to uninstall the securing means (such as the bearing 811, the washer 813, the nut 815), and the FPC pads 65, 66 will be separated with the terminal pads 871, 878 automatically because the gold balls are just provisionally disposed therebetween, while the related art must have a cleaning process because it uses solder bonding to connect the FPC pads with the terminal pads. Understandably, the gold balls 511 can be omitted herefrom, and the FPC pads 65, 66 touch contact with the terminal pads 871, 878 in a pad-to-pad way, as shown in FIG. 17A. In this embodiment, each of the FPC pads 65, 66 and the terminal pads 871, 878 has a conductive layer formed thereon, the conductive layer can be formed by plating. In an embodiment, the conductive layer is a metal layer, such as gold layer.

In the embodiment, because the trace terminals 861, 868 protrudes from the HGAs 801 and 808, it is necessary to cut the steps on the fantail spacer 805 to ensure the terminal pads 871, 878 of the trace terminal 861, 868 and the FPC pads 65, 66 contacting with the gold balls 511. In addition, the HSA 800 may further provide a screw hole on each of the HGAs 801, 808, the fantail spacer 855, the trace terminals 861, 868 and the FPC assemblies 61, 62. These screw holes are all formed adjacent to the area of terminal pads 861 or 868, or the area of the FPC pads 65 or 66, which can be drilled through by a screw (not shown) so that the gold balls 511 can be sandwiched more firmly between the terminal pads 861 with the FPC pads 65, and between the terminal pads 868 with the FPC pads 66. Accordingly, a more superior electrical connection between the HGAs 801, 808 and the FPC 807 can be attained.

Figure 18:
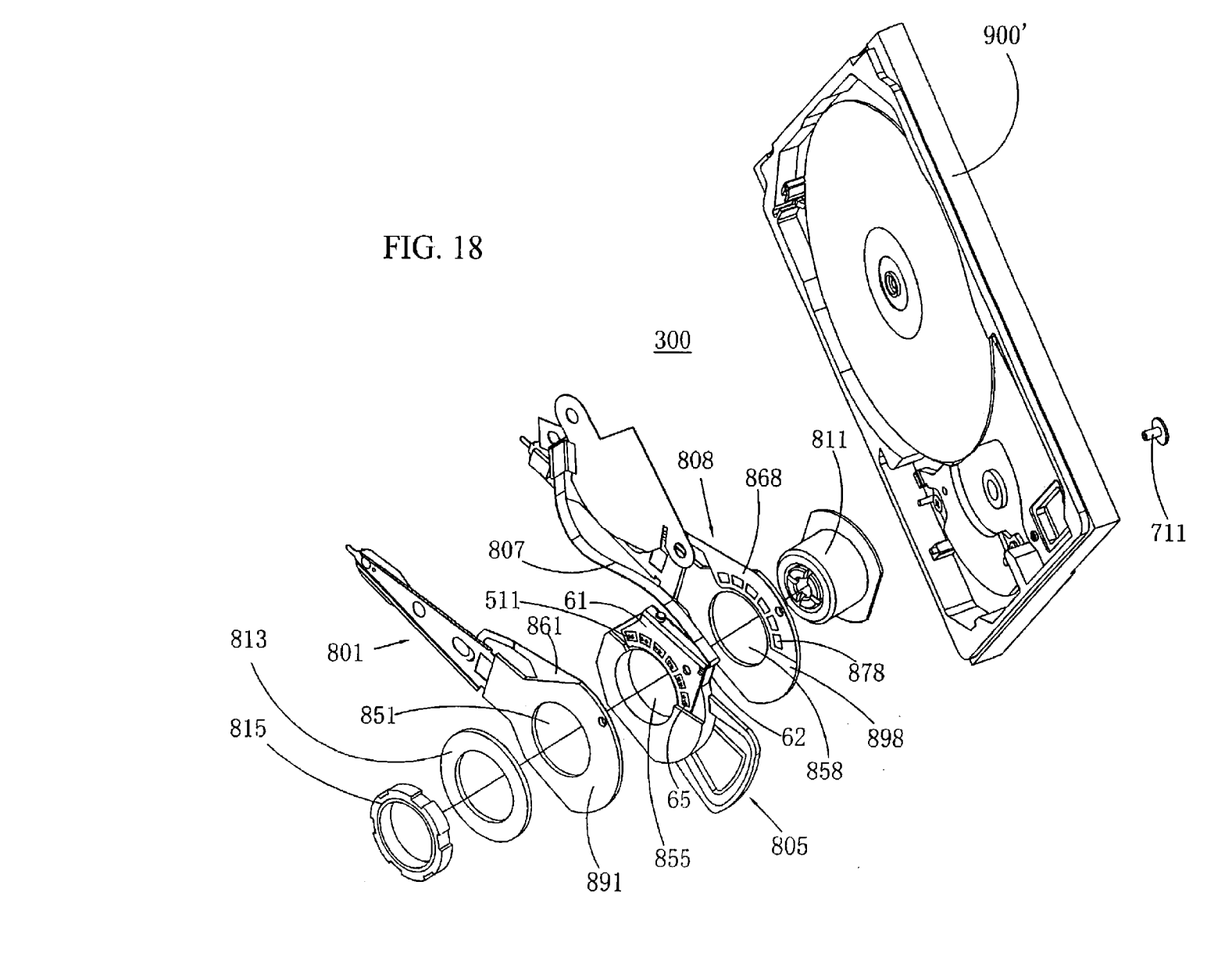
FIG. 18 is an exploded, perspective view of an disk drive unit in accordance with the second embodiment of the present invention.

In the present invention, referring to FIG. 18, a disk drive unit 300 using the HSA 800 may be assembled as follows: firstly, mounting essential parts, such as disk, ramp load, spindle motor and VCM into the motor base 900', and then the bearing 811 can be mounted into the motor base 900' by a screw 711. After that, the HGA 808, the fantail spacer 805 with the FPC 807, the HGA 801 and the washer 813 are installed into the motor base 900' in sequence. At last, the nut 815 is used to tighten the HGAs 801, 808, and the fantail spacer 805 with the FPC 807 to establish electrical connection between the terminal pads of the HGAs 801, 808 and the FPC pads of the FPC 807. For rework, it only needs to uninstall the nut 815 to replace wrong/damage part in HDA level. So the embodiment can also integrate the HSA process into the HDA process.

In the present invention, because the trace terminals and the FPC assemblies are axially secured with each other by secure means to sandwich the gold balls therebetween, so the HSA of the present invention do not need being cleaned before it is mounted in the motor base of the disk drive, that is to say, the HSA assembly line and the disk drive assembly line can be integrated together.

Obviously, conductive supporter between the terminal pads and the FPC pads is not limited to gold ball or gold solid. Other metal ball or metal solid, such as solder ball, can also act as a conductive supporter in the invention. Conductive supporter may be other conductive material which have a softness and an oxidation resistance. In addition, the HSA 100' or 800 of the present invention is not limited to comprise two HGAs, for example, the amount of the HGAs may be one, four, or more than four. Accordingly, the structure of the HSA 100' or 800 maybe change in accordance with the amount of HGAs. Such changes are well known to a person ordinarily skilled in the art, a detail description of such HSA is thus omitted.

What is claimed is:

1. A manufacturing method of disk drive unit, the method comprising:
    providing at least one head gimbal assembly having a support plate which extends from and lies in the same plane with the head gimbal assembly, the support plate having first terminal pads formed thereon;
    providing a controlling circuit for controlling the at least one head gimbal assembly having at least one flexible printed circuit assembly with second terminal pads formed thereon to connect with the first terminal pads;
    disposing the at least one head gimbal assembly and the controlling circuit into the motor base, respectively; and then
    tightening the support plate of the at least one head gimbal assembly and the at least one flexible printed circuit assembly of the controlling circuit by one screw extending through both of the support plate and the at least one flexible printed circuit assembly in a direction perpendicular to the head gimbal assembly so as to tighten both the first and second terminal pads face-to-face to have an electrical touch contact therebetween.

2. The manufacturing method according to claim 1, wherein each of the first and second terminal pads is plated with a conductive layer thereon.

3. The manufacturing method according to claim 1, further comprising a step of disposing conductive supporter between the first and second terminal pads before they are tightened.

4. A method of electrically connecting a terminal of head gimbal assembly with a terminal of controlling circuit thereof, the method comprising:
    providing first terminal pads formed on a support plate of at least one head gimbal assembly, the support plate extending from and lying in the same plane with the head gimbal assembly;
    connecting second terminal pads formed on at least one flexible printed circuit assembly of its controlling circuit to contact with each other; and then
    axially tightening both the first and second terminal pads face-to-face by one screw extending through both of the support plate and the at least one flexible printed circuit assembly in a direction perpendicular to the head gimbal assembly to have an electrical touch contact therebetween.

5. The method according to claim 4, wherein each of the first and second terminal pads is plated with a conductive layer thereon.

6. The method according to claim 4, further comprising a step of disposing conductive supporter between the first and second terminal pads to support their electrical touch contact.

7. The method according to claim 6, wherein the conductive supporter is a metal ball.

8. The method according to claim 7, wherein the metal ball is a gold ball.

* * * * *